United States Patent
Mase et al.

(10) Patent No.: US 10,987,778 B2
(45) Date of Patent: Apr. 27, 2021

(54) METHOD OF FORMING FINE DIMPLES IN A HARD-BRITTLE MATERIAL SURFACE

(71) Applicant: FUJI MANUFACTURING CO., LTD., Tokyo (JP)

(72) Inventors: Keiji Mase, Tokyo (JP); Shozo Ishibashi, Tokyo (JP); Yusuke Kondo, Tokyo (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 233 days.

(21) Appl. No.: 15/918,209

(22) Filed: Mar. 12, 2018

(65) Prior Publication Data

US 2019/0030682 A1 Jan. 31, 2019

(30) Foreign Application Priority Data

Jul. 28, 2017 (JP) .............................. JP2017-146808

(51) Int. Cl.
*B24C 1/10* (2006.01)
*C03C 19/00* (2006.01)
*C04B 41/00* (2006.01)
*C04B 41/91* (2006.01)
*C04B 41/53* (2006.01)

(52) U.S. Cl.
CPC ............... *B24C 1/10* (2013.01); *C03C 19/00* (2013.01); *C04B 41/009* (2013.01); *C04B 41/53* (2013.01); *C04B 41/91* (2013.01)

(58) Field of Classification Search
CPC ......... B24B 1/10; C03C 19/00; C04B 41/009; C04B 41/53; C04B 41/91
See application file for complete search history.

(56) References Cited

U.S. PATENT DOCUMENTS

| | | | |
|---|---|---|---|
| 5,003,805 A * | 4/1991 | Thompson | B24C 1/10 451/2 |
| 5,592,840 A | 1/1997 | Miyasaka | |
| 6,884,386 B2 | 4/2005 | Saka et al. | |
| 7,320,716 B2 * | 1/2008 | Saka | C04B 35/584 51/307 |
| 9,793,426 B2 | 10/2017 | Mase et al. | |
| 10,043,926 B2 | 8/2018 | Mase et al. | |
| 2003/0034122 A1 * | 2/2003 | Asai | B24C 1/04 156/252 |
| 2018/0222089 A1 * | 8/2018 | Mase | B24C 1/06 |
| 2019/0016013 A1 | 1/2019 | Mase et al. | |

FOREIGN PATENT DOCUMENTS

| | | |
|---|---|---|
| CN | 1795070 A | 6/2006 |
| CN | 109251061 A | 1/2019 |
| JP | 60-14615 A | 1/1985 |
| JP | H07-188738 A | 7/1995 |
| JP | H08-128448 A | 5/1996 |
| JP | 2016-156428 A | 9/2016 |
| JP | 2017-001166 A | 1/2017 |
| KR | 2003-0059150 A | 7/2003 |
| KR | 2014-0143333 A | 12/2014 |
| WO | 2004103615 A1 | 12/2004 |

OTHER PUBLICATIONS

Corresponding Korean Appl. No. 10-2018-0031869, Korean Office Action dated Aug. 27, 2019.
Corresponding Japanese Appl. No. 2017-146808, Japanese Office Action dated Sep. 6, 2019.
Corresponding Japanese Appl. No. 2017-146808, Japanese Office Action dated May 22, 2019.
Chinese Office Action issued in Chinese Patent Application No. 201810239260.2 dated Apr. 27, 2020.
Su Xiao, "A multi-phase micro-abrasive jet machining technique for the surface texturing of mechanical seals," Chinese Master's Theses Full-text Database; Engineering Science and Technology II, 2017 No. 3, Feb. 16-Mar. 15, 2017, pp. 27-46, Partial English translation.

* cited by examiner

*Primary Examiner* — Dung Van Nguyen
(74) *Attorney, Agent, or Firm* — Pearne & Gordon LLP (57) ABSTRACT

The present invention is directed to provide a method of forming dimples comparatively simply on a surface of hard-brittle materials such as ceramics by post-processing. In the method, substantially spherical ejection particles having a median diameter d50 of from 1 μm to 20 μm are ejected together with a compressed gas at an ejection pressure of from 0.01 MPa to 0.7 MPa against a dimple formation region which is a region where dimples are to be formed on a surface of an article made from a hard-brittle material or a surface of an article having a surface coated with a coating layer of a hard-brittle material, or the like so as to form dimples on the surface of the hard-brittle material by plastic deformation without occurrences of breaks or cracks.

14 Claims, 4 Drawing Sheets

Particle diameter of ejection particle: 10 μm

FIG. 4

Particle diameter of ejection particle: 50 μm

METHOD OF FORMING FINE DIMPLES IN A HARD-BRITTLE MATERIAL SURFACE

BACKGROUND OF THE INVENTION

1. Field of the Invention

The present invention relates to a method of forming fine depressions (dimples) having micro-order opening diameters in a surface of a hard-brittle material such as a ceramic.

Note that a surface of a hard-brittle material in the present invention not only includes general surfaces formed from hard-brittle materials and surfaces of articles made from hard-brittle materials, but also includes coating layers of hard-brittle materials formed on the surfaces of articles of various substances, such as, for example, ceramic coating surfaces.

2. Description of the Related Art

Ceramics are examples of hard-brittle materials employed as the material for various articles, as coating agents, and the like. Due to having high hardness and excellent heat resistance, wear resistance, and the like, ceramics are employed in articles that contact other members, for example as configuring materials and coating agents for sliding components and mold surfaces.

In order to reduce the frictional resistance of sliding portions and to achieve improved demoldability, fine depressions (dimples) are formed on such sliding components and mold surfaces in order to retain lubricating agents, release agents, and the like in the dimples.

When the article to be formed with dimples is made from metal, then such dimples can be formed by causing plastic deformation of the article surface. There is a proposal for such a method in which indentations generated by ejecting substantially spherical ejection particles in a high speed bombardment are served as reservoirs for retaining a lubricating oil (Patent Document 1).

However, when the sliding component is formed from a ceramic or is ceramic coated, dimples cannot be formed by plastic deformation like that in a metal. Because ceramics are hard-brittle materials which have high hardness, on the one hand, and are also difficult to deform, suddenly breaking without metal-like plastic deformation when imparted with a large force reaching the limitations of strength.

Therefore, in order to form dimples in a ceramic, either the ceramic is prepared by forming dimples prior to sintering, or, when forming dimples by post-processing, the dimples are formed by a method other than plastic deformation, such as by using brittle fracture.

Methods to form dimples by pre-sintering preparation include a method in which dimples are formed by molding a mixture of resin, foaming agent, whiskers, or the like added to a ceramic raw material, which is then sintered to form dimples by burning the added resin or foaming agent during sintering (see paragraph [0030] of Patent Document 2). There is also a method of molding a ceramic raw material before sintering by employing a mold formed with protrusions corresponding to dimples, and then sintering (see paragraph [0031] of Patent Document 2).

Methods to form dimples in a ceramic after sintering by post-processing include a proposal to form fine dimples by emitting a single pulse laser having a pulse width shorter than that of a picosecond laser onto a surface of a ceramic rolling body of a bearing or a constant-velocity joint (Patent Document 3).

RELATED ARTS

Patent Documents

Patent Document 1: JP H07-188738A
Patent Document 2: JP H08-128448A
Patent Document 3: JP 2016-156428A Process control to form uniform, isolated and non-connected dimples is difficult in the method, from among the methods described above for forming dimples, in which dimples are formed by molding a mixture of resin, foaming agent, whiskers, or the like added to a ceramic raw material and then sintering to burn the added resin, foaming agent, etc. The lack of process control makes it difficult to manufacture articles of consistent quality.

Moreover, manufacturing control is complicated in such a method, from the perspective that the type and amount of resin, foaming agent etc. to be added to the material of the articles to be manufactured needs to be adjusted for each type of ceramic, and for each type of article to be manufactured.

In contrast thereto, the method of molding a ceramic raw material prior to sintering by employing a mold formed with protrusions corresponding to dimples and then sintering enables articles molded using such a mold to be produced with a quality that does not vary between articles, in that all articles have dimples formed in the same place and with the same shape.

However, forming dimples with such a method is only applicable to articles molded with that particular mold. To form dimples on other articles requires preparation of a mold formed with protrusions that will become dimples, with the protrusions being formed in an appropriate placement for each article to be manufactured. This raises manufacturing costs.

In particular, there is a proposal in Patent Document 2 to form, as well as semi-spherical dimples, dimples that have angular shapes, such as rectangular shapes, star shapes, circular chain-link shapes, etc. However, in such angular shapes, force concentrates at the angular portions during sliding, and this can cause breakage to occur. Moreover, when chipping or the like occurs, any fragments arising from chipping scratch and wear sliding surfaces, with this causing abrasive wear.

Moreover, all of the above methods need preparation prior to sintering to form dimples, and are not able to form dimples by post-processing ceramic surfaces after sintering.

Moreover, none of the methods for forming dimples on ceramics articles described above are able to form dimples on a ceramic coating.

In contrast thereto, the method described in Patent Document 3 for forming fine dimples by emitting a single pulse laser onto the surface of a rolling body made from ceramic is able to form dimples by post-processing on a ceramic article after sintering. This method is also able to manufacture articles with uniform quality by forming dimples of the same size, and at the same spacing on each rolling body.

However, in order to form dimples at the same size and at the same spacing by forming dimples using such a method requires an operation to emit a single pulse laser at a fixed spacing onto the surface, while rolling each of the rolling bodies in a predetermined direction. A large initial investment is accordingly required since complicated and costly treatment equipment is needed to enable such complicated work to be performed.

Moreover, the operation to form the dimples of the same size and at the same spacing on each of the rolling bodies takes a long time to perform. This results in higher costs to form the dimples, and leads to an increase in the price of rolling bodies formed with dimples by this method.

Furthermore, when dimples are formed by pulse laser emission, matter sputtered from the material surface in processing forms fine particles, i.e. debris that adhere to and contaminate the surface. An operation to remove such debris is accordingly required after dimple formation, since such debris would be a cause of abrasive wear by such debris becoming interposed between friction surfaces, and scratching the surfaces of sliding portions.

Note that although an example has been described above of forming dimples in order to retain a lubricating agent such as a lubricating oil on the sliding surfaces of sliding components, there is no limitation in application to sliding surfaces of sliding members. Sometimes such dimple formation is to retain a release agent or air on the surface of a mold in order to improve demoldability etc. There is accordingly a demand for a method capable of forming dimples on the surface of various ceramics articles and ceramic coatings, and capable of forming dimples on ceramic surfaces simply and at low cost.

The present invention addresses such a demand, and an object of the present invention is to provide a method of forming dimples that can be introduced at a comparatively modest price by employing an existing treatment apparatus, and yet is also capable of forming dimples at low cost using a comparatively simple method by post-processing in hard-brittle materials typified by ceramics irrespective of the shape or quality of the article to be treated.

SUMMARY OF THE INVENTION

In order to achieve the above object, a method of forming fine dimples on a surface of a hard-brittle material is characterized by comprising:

ejecting substantially spherical ejection particles having a median diameter d50 of from 1 µm to 20 µm together with a compressed gas at an ejection pressure of from 0.01 MPa to 0.7 MPa against a dimple formation region which is a region where the dimples are to be formed on the surface made from a hard-brittle material such as ceramics of an article to be treated or an article having a surface coated with a coating layer of a hard-brittle material, or the like so as to form the dimples on the surface of the hard-brittle material by plastic deformation.

"Median diameter d50" refers to the diameter at a cumulative mass 50 percentile, namely, to a diameter that when employed as a particle diameter to divide a group of particles into two, results in the total mass of particles in the group of particles of larger diameter being the same as the total mass of particles in the group of particles of smaller diameter. This is the same definition as "particle diameter at a cumulative 50% point" in JIS R 6001 (1987).

Each of the dimples has an opening diameter of from 1 µm to 20 µm, and a depth of from 0.01 µm to 1 µm as one example.

Preferably, the dimples are formed so that a total surface area of openings of the dimples is 50% or more of the surface area of the dimple formation region.

Preferable, the hard-brittle material is a ceramic or a glass. A sliding component made from ceramics may be employed as the article to be treated, and a sliding surface of the sliding component may be employed as the dimple formation region.

Advantageous Effects

In the configuration of the present invention described above, the following significant advantageous effects can be obtained by the method of the present invention.

Dimples can be formed in surfaces of hard-brittle material such as ceramics using an extremely simple method in which substantially spherical ejection particles having a median diameter d50 of from 1 µm to 20 µm are ejected together with a compressed gas at an ejection pressure of from 0.01 MPa to 0.7 MPa.

The occurrence of breaks or cracks is not seen in hard-brittle materials even with such dimple formation, and no machining dust was seen to be generated when the dimples were formed. In addition, a greatly increased compressive residual stress was obtained (in detail, the compressive residual stress is changed from 1000 MPa before treatment to 2200 MPa after treatment) on the surface of ceramic articles (for example a cemented carbide having a main component of WC) after treatment with the method of the present invention, as seen in the results of X-ray diffraction analysis of the ceramic article surface. It is therefore thought that dimple formation by the method of the present invention is achieved by forming dimples by plastically deforming the surface of a hard-brittle material, and not by brittle fracture thereof.

Moreover, dimple formation by the above method can be performed by treatment for a comparatively short time using a known air blasting apparatus having a comparatively modest cost. This enables the cost for forming dimples to be suppressed to a low cost.

BRIEF DESCRIPTION OF THE DRAWINGS

The objects and advantages of the invention will become understood from the following detailed description of preferred embodiments thereof in connection with the accompanying drawings in which like numerals designate like elements, and in which:

FIG. 5 illustrate surface cross-section profiles of a test piece (soda glass)

DETAILED DESCRIPTION OF THE PREFERRED EMBODIMENTS

A description follows regarding embodiments of the present invention, with reference to the appended drawings.

(Object to be Treated)

The article to form dimples on using the method of the present invention (article to be treated) may be any of various articles having an outermost surface configured by a hard-brittle material, such as an article made from a hard-brittle material, or an article having a surface coated with a coating layer of a hard-brittle material, or the like.

The hard-brittle material includes single crystal silicon as well as ceramics. Such ceramics include inorganic solid materials in general mainly made from non-metals, such as oxides, carbides, nitrides, borides, silicides, fluorides, sulfides, carbon, etc. Examples of ceramics of the present invention include alumina ($Al_2O_3$), zirconia ($ZrO_2$), dioxide silicon ($SiO_2$), barium titanate ($BaO_3Ti$), yttrium oxide ($Y_2O_3$), silicon carbide (SiC), tungsten carbide (WC), titanium carbide (TiC), silicon nitride ($Si_3N_4$), titanium nitride (TiN), titanium aluminum nitride (TiAlN), titanium boride ($TiB_2$), zirconium boride ($ZrB_2$), molybdenum silicide ($MoSi_2$), tungsten silicide ($WSi_2$), calcium fluoride ($CaF_2$), diamond-like carbon (DLC), and glass (such as soda glass, lead glass, borosilicate glass) whose main component is the above listed silicon dioxide ($SiO_2$).

Moreover, the method of the present invention is applicable to various articles, irrespective of what the article is used for, as long as the article is made from a hard-brittle material, or is an article coated with a hard-brittle material, as described above. Moreover, dimples can be formed on a part of the article surface, and when applied to a sliding member employed to contact another member, such as a bearing, shaft, gear wheel, or the like, then the treatment may be applied just to parts of the sliding member that slide against the other member.

(Method for Forming Dimples)

A dimple formation region, this being a region on the surface of the article to be treated where dimples are to be formed, is treated by ejecting substantially spherical ejection particles together with compressed gas so as to bombard the dimple formation region.

Examples of ejection particles, ejection apparatus, and ejection conditions employed when performing the above treatment are given below.

(1) Ejection Particles

For the substantially spherical ejection particles employed in the surface treatment method of the present invention, "substantially spherical" means that they do not need to be strictly "spherical", and ordinary "shot" may be employed therefor. Particles of any non-angular shape, such as an elliptical shape and a barrel shape, are included in "substantially spherical ejection particles" employed in the present invention.

Materials that may be employed for the ejection particles include both metal-based and ceramic-based materials. Examples of materials for metal-based ejection particles include steel, high-speed tool steels (HSS), stainless steels, chromium boron steels (FeCrB), and the like. Examples of materials for ceramic-based ejection particles include alumina ($Al_2O_3$), zirconia ($ZrO_2$), zircon ($ZrSiO_4$), silicon carbide (SiC), hard glass, and the like.

Regarding the particle diameter of the ejection particles employed, particles having a median diameter (d50) in a range of from 1 μm to 20 μm may be employed.

(2) Ejection Apparatus

A known blasting apparatus for ejecting abrasives together with a compressed gas (air, argon, nitrogen, or the like) may be employed as the ejection apparatus to eject the ejection particles described above against the surface of the article to be treated.

Such blasting apparatuses are commercially available, such as a suction type blasting apparatus that ejects abrasives using a negative pressure generated by ejecting compressed gas, a gravity type blasting apparatus that causes abrasives falling from an abrasive tank to be carried and ejected by compressed gas, a direct pressure type blasting apparatus in which compressed gas is introduced into a tank filled with abrasives and the abrasives are ejected by merging the abrasive flow from the abrasive tank with a compressed gas flow from a separately provided compressed gas supply source, and a blower type blasting apparatus that carries and ejects the compressed gas flow from a direct pressure type blasting apparatus with a gas flow generated by a blower unit. Any one of the above may be employed to eject the ejection particles described above.

(3) Treatment Conditions

Substantially spherical ejection particles formed with a median diameter d50 of from 1 μm to 20 μm using one of the materials described above or the like are ejected, together with compressed gas at an ejection pressure of from 0.01 MPa to 0.7 MPa, against the article to be treated described above.

This enables dimples each having an opening diameter of from 1 μm to 20 μm, and a depth of from 0.01 μm to 1 μm, to be formed on the surface of a hard-brittle material.

The ejection of the ejection particles is performed such that the total surface area of openings of the dimples formed is not less than 50% of the surface area of the dimple formation region.

(Dimple Formation Test 1)

(1) Test Purpose

To confirm changes in the state of surfaces of hard-brittle materials as ejection conditions of ejection particles are changed, and to confirm an improvement in slidability by forming dimples.

(2) Test Method

Ejection particles were ejected against an article to be treated, in this case a mold made from zirconia ($ZrO_2$) (a mold that has been lap polished to give a surface with an arithmetic average roughness (Ra) of 0.1 μm or less) for extrusion molding an aluminum alloy, under the conditions listed in Table 1 below.

TABLE 1

| | Ejection Conditions of Ejection Particle | | |
|---|---|---|---|
| Treatment Conditions | Example 1 | Example 2 | Example 3 |
| Ejection Type/Model No. of Ejection Apparatus | Suction Type/SFK-2 (manufactured by Fuji Manufacturing Co., Ltd.) | Blower Type/LDQ-3 (manufactured by Fuji Manufacturing Co., Ltd.) | Direct Pressure Type/FDQ-3 (manufactured by Fuji Manufacturing Co., Ltd.) |
| Ejection Particle | Particle made from Alumina with particle diameter of 10 μm (d50) | Particle made from Zirconia with particle diameter of 18 μm (d50) | Particle made from Alloy steel with particle diameter of 5 μm (d50) |
| Ejection Pressure | 0.5 MPa | 0.05 MPa | 0.3 MPa |
| Nozzle Diameter | φ7 mm | φ9 mm | φ5 mm |
| Ejection Time | 60 seconds | 120 seconds | 60 seconds |

The surface roughness profile of the untreated molds, and the surface roughness profile of the molds after treatment under the conditions listed above, were observed using a profile analyzing laser microscope ("VK-X250" manufactured by Keyence Corporation).

Moreover, the untreated molds, and the molds treated under the conditions of Examples 1 to 3 listed above were employed to extrusion mold an aluminum alloy, and the state of adhesion of aluminum to the mold surfaces was observed with the naked eye.

(3) Measurement Results

Figure 1A:
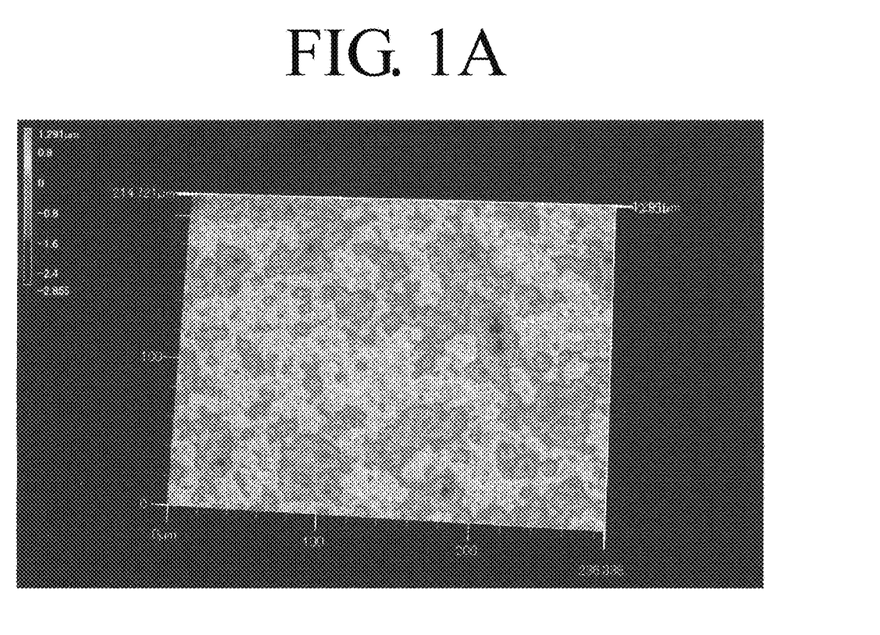
FIG. 1A is a surface photomicrograph of a mold of an Example 1.
Figure 1B:
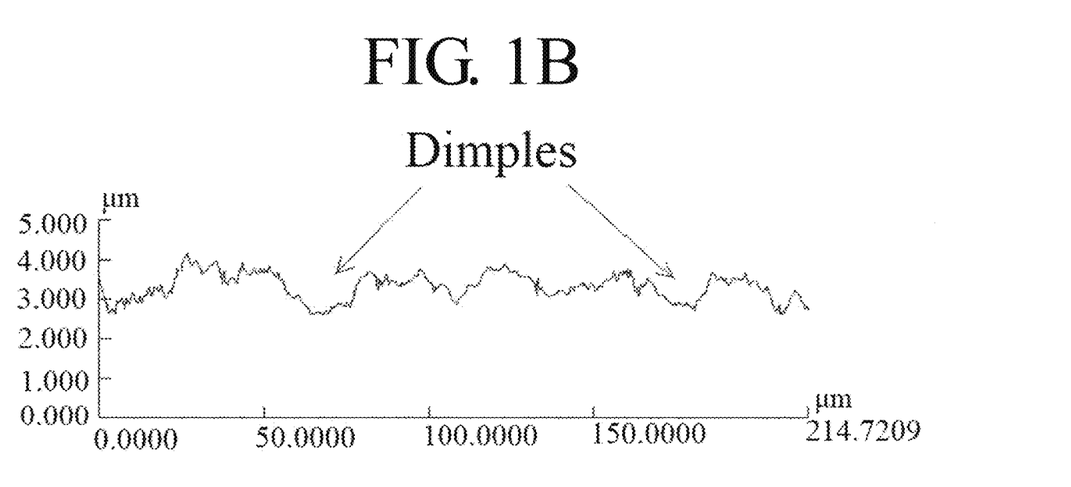
FIG. 1B is a surface cross-section profile thereof.

FIG. 1 is an observation result by a profile analyzing laser microscope of the mold surface after forming dimples under conditions of Example 1 listed above. FIG. 1A is a photomicrograph imaging the mold surface, and FIG. 1B is a cross-section profile of a surface of a dimple formation region derived from the analysis results.

Note that since substantially the same results were seen for surface profiles of molds treated under conditions of Examples 2 and 3, FIG. 1 only illustrates the surface profile of the mold treated under conditions of Example 1 as a typical example thereof, and observation results by profile analyzing laser microscope of mold surfaces treated under conditions of Examples 2 and 3 are omitted from illustration.

Figure 2A:
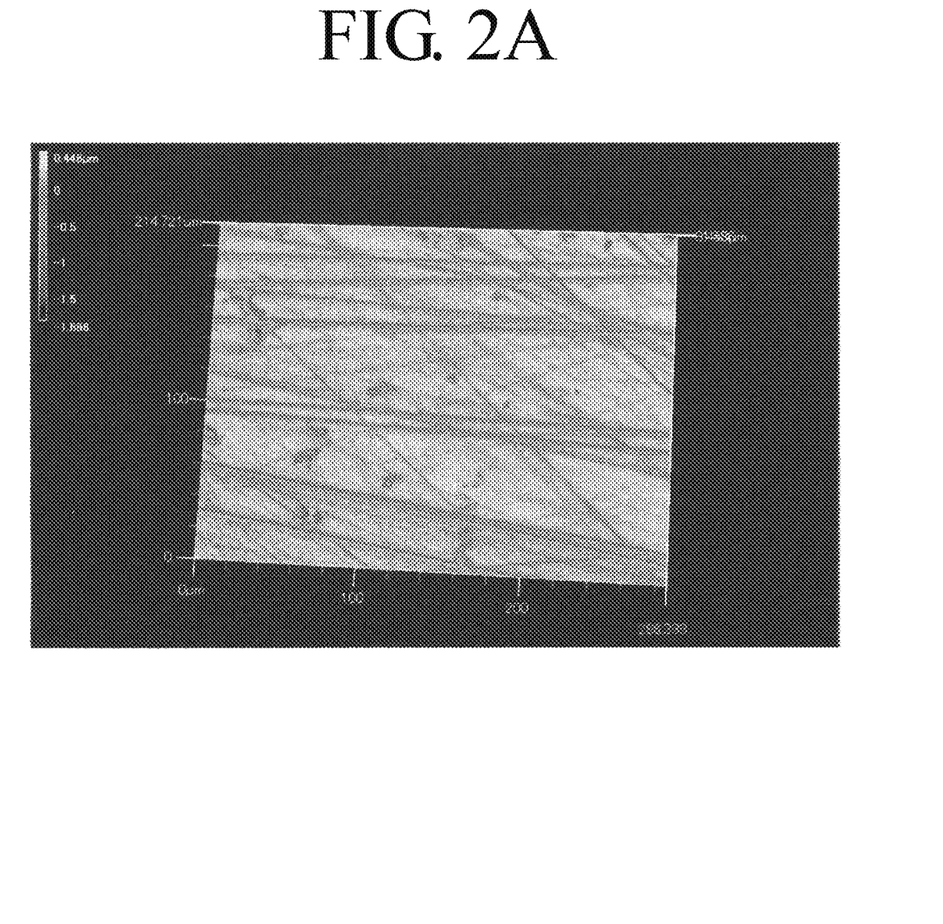
FIG. 2A is a surface photomicrograph of a mold of a comparative example (untreated)
Figure 2B:
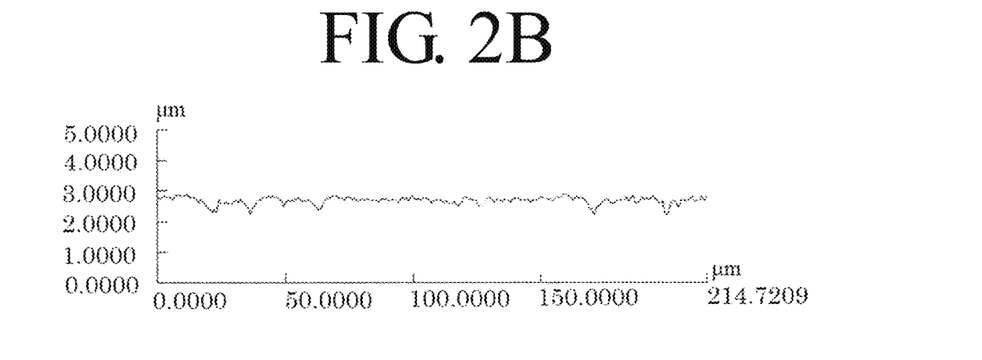
FIG. 2B is a surface cross-section profile thereof.

For comparison purposes, the observation results by profile analyzing laser microscope of the surface of an untreated mold is illustrated in FIG. 2. FIG. 2A is a photomicrograph imaging the mold surface, and FIG. 2B is a cross-section profile of the surface derived from the analysis results.

The results of observing the state of adhesion of aluminum to mold surfaces after extrusion molding was performed with the molds of Examples 1 to 3 and an untreated mold (comparative example) are listed in Table 2.

TABLE 2

Observation Results of Aluminum Adhesion State

| | Example 1 | Example 2 | Example 3 | Comparative Example (Untreated) |
|---|---|---|---|---|
| State of aluminum adhesion | extremely slight adhesion | slight adhesion | extremely slight adhesion | considerable adhesion |

It is apparent from a comparison of FIG. 1 and FIG. 2 that for surfaces of an untreated mold with a comparatively smooth state (see FIG. 2), dimples (semi-spherical depressions) are formed in the mold surfaces after performing treatment under conditions of Example 1 (see FIG. 1).

Moreover, it was confirmed in observations performed with a similar profile analyzing laser microscope that similar dimples were formed in molds treated under conditions of Examples 2 and 3.

Note that there were no occurrences of breaks or cracks seen on mold surfaces after treatment by the treatment under any of the conditions of Examples 1 to 3. There was also no machining dust seen generated during treatment, and in addition a greatly increased compressive residual stress was seen on the surfaces after treatment with the method of the present invention. Thus the formation of dimples as described above is surmised to occur through plastic deformation rather than through brittle fracture.

As indicated in Table 2, molds formed with dimples by the method of the present invention were confirmed not to be susceptible to aluminum adhesion, confirming that dimples formed by the method of the present invention make a contribution to improved slidability between the molding material and mold surface.

(4) Interpretation

Dimples can be formed using the method of the present invention in zirconia, which is a hard-brittle material, without breaks or cracks occurring. Though the dimples are thought to be formed due to plastic deformation, the underlying theory is not completely understood. It is thought that dimple formation by such plastic deformation can be implemented due to using fine ejection particles having a median diameter (d50) of from 1 μm to 20 μm.

Namely, it is thought that the permanent deformation energy per unit volume needs to be high when imparting force in order to generated plastic deformation in a hard-brittle material such as a ceramic. In the case of the present invention, a large force (impact force) needs to be imparted to a minute region when the ejection particles are being bombarded.

Figure 3:
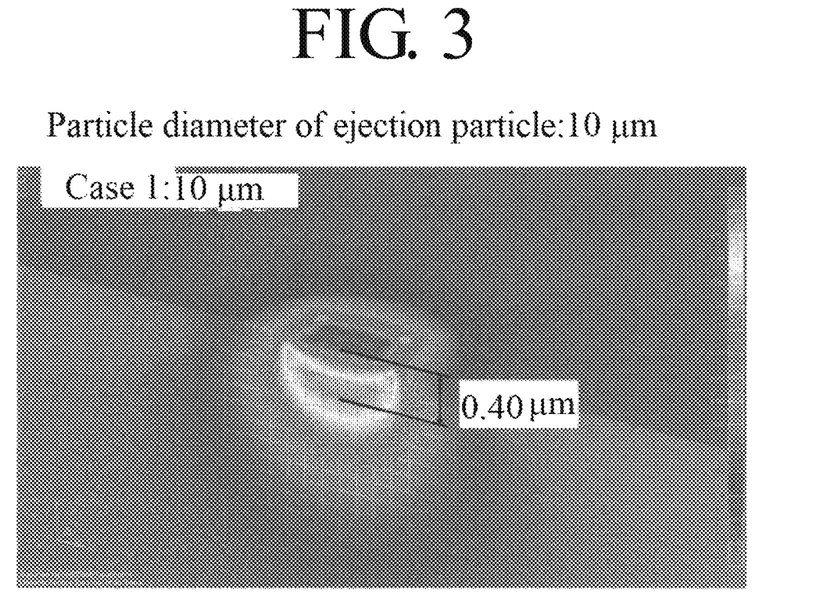
FIG. 3 is a Von Mises stress analysis image using a FEM (particle diameter of ejection particle: 10 µm)
Figure 4:
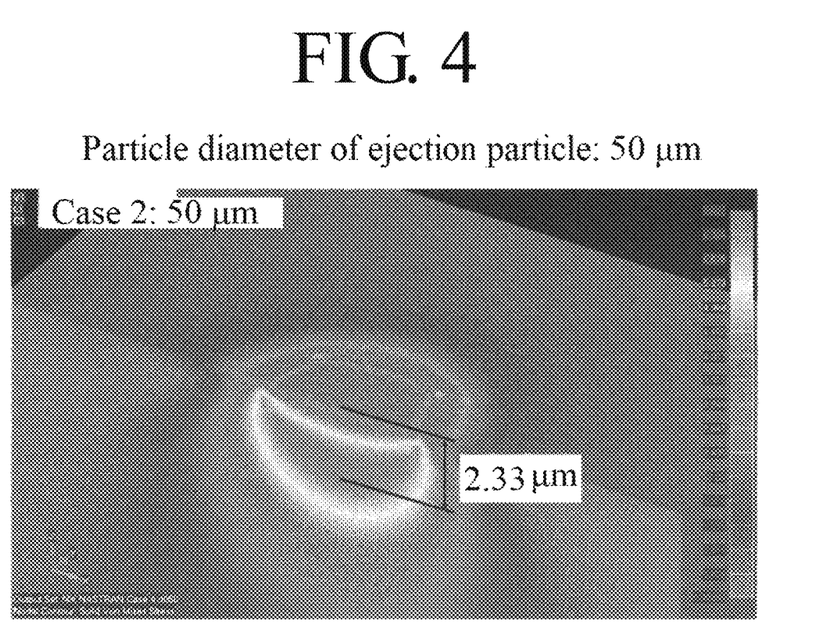
FIG. 4 is a Von Mises stress analysis image using a FEM (particle diameter of ejection particle: 50 µm)

FIG. 3 and FIG. 4 illustrate the results of simulations performed by Von Mises stress analysis, using a finite element method (FEM) (hereinafter simply referred to as FEM analysis) on a workpiece bombarded by two types of ejection particles (with density of 7.85) made from steel. The result of the simulation using the ejection particle having a particle diameter of 10 μm is illustrated in FIG. 3. The result of the simulation using the ejection particle having a particle diameter of 50 μm is illustrated in FIG. 4.

FEM analysis is a numerical analysis method for use in cases that are difficult to solve by analytical methods such as complex geometric models. In FEM analysis, a domain is divided into finite elements, simple formulae are established at the element level, and a solution for the whole domain is obtained by using interpolation functions between elements to make an approximation thereof. "Femap with NX Nastran" (manufactured by NST Co., Ltd.) was employed as analysis software.

"Von Mises stress" is equivalent stress based on shear strain energy theory. Von Mises stress is expressed as a scalar value without directionality, and is a value for uniaxial tension or compressive stress in a stress field where complex loading acts in plural directions.

The Von Mises stress is referenced as an indicator to determine whether or not a material will yield. This means that there is no need to look at stress in other directions when comparing against yield stress, and yield determination is made using a single Von Mises stress. This was utilized to simulate stress arising from bombardment with the ejection particles.

It is apparent from looking at the simulation results that in the relationship between particle diameter of ejection particles and input depth of stress, a high stress is input to extremely shallow layers at the surface as the particle diameter of the ejection particles gets smaller. Stress is input to deeper layers as the particle diameter gets larger, but this stress is lower.

In the contour diagrams of FIG. 3 and FIG. 4, the center of the portions where a crescent shape can be seen represents the portion with the strongest input of stress.

The maximum stress is 8.752 kgf/mm$^2$ when ejection particles having particle diameter of 10 μm are ejected. On the other hand, the maximum stress is 6.084 kgf/mm$^2$ when ejection particles having particle diameter of 50 μm are ejected. That is, when the ejection particles having particle diameter of 10 μm are employed, the generated maximum stress is 1.4 times higher in comparison with a case in which ejection particles having particle diameter of 50 μm are employed.

Moreover, the maximum stress is generated at the depth of 2.33 μm from the uppermost surface of the workpiece in cases in which ejection particles having particle diameter of 50 μm are employed. On the other hand, the maximum stress is generated at the depth of 0.40 μm from the uppermost surface of the workpiece in cases in which ejection particles having particle diameter of 10 μm are employed. That is, when the ejection particles having particle diameter of 10 μm are employed, the depth at which the maximum stress is generated becomes shallower by about ⅙ in comparison with the case when the ejection particles having particle diameter of 50 μm are employed. Thus, the impact force per unit volume increases remarkably as the particle diameter of the ejection particles gets smaller.

An impact force that exceeds the yield point can accordingly be imparted to the surface of a hard-brittle material article in the method of the present invention in which ejection particles with fine particle diameters having a median diameter (d50) of from 1 μm to 20 μm are employed. As a result, it is thought that dimples can be formed by plastic deformation.

(Dimple Formation Test 2)

(1) Test Purpose

To confirm that dimples can be formed by the method of the present invention, even on hard-brittle materials other than the zirconia that was subjected to treatment in the above "Dimple Formation Test 1".

(2) Test Method

The respective surface profiles of an untreated test piece manufactured from soda glass (10 mm long×10 mm wide×2 mm thick) and a soda glass test piece after forming dimples by ejecting ejection particles using the method of the present invention were observed using a profile analyzing laser microscope ("VK-X250" manufactured by Keyence Corporation).

The ejection particles were ejected against the entire surface of the test pieces under the ejection conditions listed in Table 3 below.

TABLE 3

| Conditions of Ejecting Ejection Particles against Test Pieces (Soda Glass) | |
|---|---|
| Ejection Type/Model No. of Ejection Apparatus | Suction Type/SFK-2 (manufactured by Fuji Manufacturing Co., Ltd.) |
| Ejection Particles | Particle made from Alumina with particle diameter of 1 μm (d50) |
| Ejection Pressure | 0.7 MPa |
| Nozzle Diameter | φ7 mm |
| Ejection Time | 3 seconds |

(3) Measurement Results

Figure 5A:
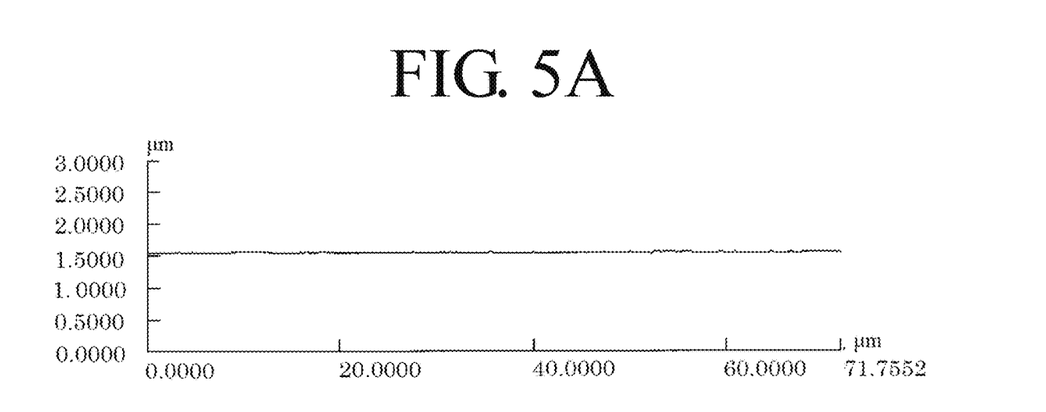
FIG. 5A is the surface of the test piece after treatment according to the present invention and FIG. 5B is an untreated surface of the test piece.
Figure 5B:
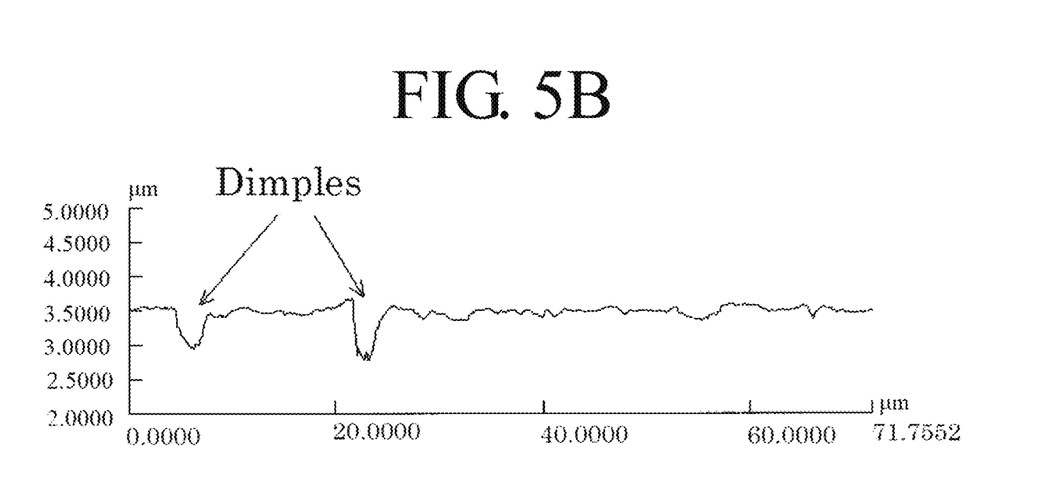

FIG. 5A illustrates a surface profile (cross-section) of an untreated test piece, and FIG. 5B illustrates a surface profile (cross-section) of a test piece after treatment with the method of the present invention.

The surface of the untreated test piece (FIG. 5A) was flat without any obvious indentations or protrusions. On the other hand, it was confirmed that dimples were formed on the surface of the test piece in a state after the treatment according to the method of the present invention (FIG. 5B).

Moreover, in the test on soda glass, no occurrences of breaks or cracks could be seen on the test pieces after treatment. There was also no machining dust seen to be generated from the soda glass during bombardment by the ejection particles, and a compressive residual stress was also imparted. The dimples were accordingly surmised to be dimples obtained by plastic deformation.

(4) Interpretation

The above results confirmed that the method of the present invention was not limited to zirconia, and could also form dimples by plastic deformation on the surface of soda glass.

From the above findings, it is logically surmised that the method of the present invention is not limited to the objects treated in the Examples, i.e. zirconia and soda glass, but is also applicable to forming dimples on other hard-brittle materials.

The method of the present invention described above is applicable to any application requiring dimples to be formed on a surface of a hard-brittle material.

Examples thereof include application to ceramic articles and articles that have been coated in a ceramic, and also to achieving a reduction in frictional resistance by forming dimples on sliding surfaces of sliding members, and reducing the contact surface area by retaining a liquid or solid lubricating agent in the dimples, or by causing air to be trapped in the dimples as reservoirs.

By forming dimples in a mold surface, an improvement in demoldability can also be achieved accompanying a reduction in contact surface area due to retaining a release agent in the dimples, or due to trapping air in the dimples as reservoirs.

In addition, due to being able to make a surface of a ceramic into a surface with excellent ability to retain various liquids (a drug, perfume, fat, oil, or the like) by forming dimples thereon, the method of the present invention is also applicable to the following: to dampening rollers made from ceramics for use in printing and the like; as surface treatment for rollers made from ceramics for use in coating liquids and fats; to treatments to improve slidability etc. as described above; and to various ceramic products where there is a need to improve the retainability of a liquid.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

The invention claimed is:

1. A method of forming fine dimples on a surface of a hard-brittle material, comprising:

ejecting non-angular shape ejection particles having a median diameter d50 of from 1 μm to 18 μm together with a compressed gas at an ejection pressure of from 0.01 MPa to 0.7 MPa against a dimple formation region which is a region where the dimples are to be formed on the surface of the hard-brittle material of an article to be treated; and forming the dimples with liquid retention on the surface of the hard-brittle material by plastic deformation.

2. The method according to claim 1, wherein each of the dimples has an opening diameter of from 1 μm to 20 μm, and a depth of from 0.01 μm to 1 μm.

3. The method according to claim 2, wherein the hard-brittle material is a ceramic.

4. The method according to claim 3, wherein:
a sliding component is employed as the article to be treated; and
a sliding surface of the sliding component is employed as the dimple formation region.

5. The method according to claim 2, wherein the hard-brittle material is a glass.

6. The method according to claim 1, wherein the dimples are formed so that a total surface area of openings of the dimples is 50% or more of the surface area of the dimple formation region.

7. The method according to claim 6, wherein the hard-brittle material is a ceramic.

8. The method according to claim 7, wherein:
a sliding component is employed as the article to be treated; and
a sliding surface of the sliding component is employed as the dimple formation region.

9. The method according to claim 6, wherein the hard-brittle material is a glass.

10. The method according to claim 1, wherein the hard-brittle material is a ceramic.

11. The method according to claim 10, wherein:
a sliding component is employed as the article to be treated; and
a sliding surface of the sliding component is employed as the dimple formation region.

12. The method according to claim 1, wherein the hard-brittle material is a glass.

13. The method according to claim 1, wherein the non-angular shape ejection particles comprise particles of an elliptical shape, a barrel shape, or a combination of the elliptical shape and the barrel shape.

14. A method of forming fine dimples on a surface of a hard-brittle material, comprising:
ejecting non-angular shape substantially spherical ejection particles having a median diameter d50 of from 1 μm to 18 μm together with a compressed gas at an ejection pressure of from 0.01 MPa to 0.7 MPa against a dimple formation region which is a region where the dimples are to be formed on the surface of the hard-brittle material of an article to be treated; and forming the dimples with liquid retention on the surface of the hard-brittle material by plastic deformation,
wherein the hard-brittle material is a ceramic,
a sliding component is employed as the article to be treated, and
a sliding surface of the sliding component is employed as the dimple formation region.

* * * * *